(12) United States Patent
Thornberry et al.

(10) Patent No.: US 10,450,855 B2
(45) Date of Patent: Oct. 22, 2019

(54) SYSTEM AND METHOD FOR PARAMETER MEASUREMENT IN WELL

(71) Applicant: SERCEL-GRC CORP, Tulsa, OK (US)

(72) Inventors: Anthony Thornberry, Tulsa, OK (US); John Ainslie, Tulsa, OK (US); David Covington, Tulsa, OK (US)

(73) Assignee: SERCEL-GRC CORP., Tulsa, OK (US)

( * ) Notice: Subject to any disclaimer, the term of this patent is extended or adjusted under 35 U.S.C. 154(b) by 670 days.

(21) Appl. No.: 15/089,698

(22) Filed: Apr. 4, 2016

(65) Prior Publication Data
US 2017/0284189 A1    Oct. 5, 2017

(51) Int. Cl.
*E21B 47/06*    (2012.01)
*E21B 49/08*    (2006.01)
*G01V 11/00*    (2006.01)
*E21B 47/12*    (2012.01)

(52) U.S. Cl.
CPC ............ *E21B 47/065* (2013.01); *E21B 47/06* (2013.01); *E21B 47/12* (2013.01); *E21B 47/122* (2013.01); *E21B 49/08* (2013.01); *G01V 11/002* (2013.01); *E21B 2049/085* (2013.01)

(58) Field of Classification Search
CPC ...... E21B 47/065; E21B 47/122; E21B 47/12; E21B 47/06; E21B 49/08; E21B 2049/085; G01V 11/002
See application file for complete search history.

(56) References Cited

U.S. PATENT DOCUMENTS

| | | | |
|---|---|---|---|
| 7,636,052 B2 | 12/2009 | Coates et al. | |
| 7,647,965 B2 | 1/2010 | Powell et al. | |
| 9,097,101 B2 | 8/2015 | Smithson | |
| 9,201,156 B2 | 12/2015 | Smithson | |
| 2003/0101822 A1 | 6/2003 | Atherton | |
| 2014/0311235 A1 | 10/2014 | Kirikera et al. | |
| 2015/0260595 A1 | 9/2015 | Montoya | |

FOREIGN PATENT DOCUMENTS

WO    2014152975 A2    9/2014

OTHER PUBLICATIONS

Extended European Search Report received in corresponding Application No. 17162748.2, dated Sep. 26, 2017. The reference not cited therein has been previously made of record.

*Primary Examiner* — Regis J Betsch
*Assistant Examiner* — Jeremy A Delozier
(74) *Attorney, Agent, or Firm* — Patent Portfolio Builders PLLC

(57) ABSTRACT

System and method for measuring a parameter within a well. The method includes connecting a gauge to a first end of a cable and connecting a vector network analyzer to a second end of the cable, lowering the gauge inside the well, generating a signal with the vector network analyzer and sending the signal along the cable to the gauge, sweeping a frequency of the signal within a given range while feeding the signal to the gauge, determining a resonance frequency of at least one sensor located within the gauge, and calculating the parameter from the resonance frequency of the at least one sensor.

17 Claims, 10 Drawing Sheets

SYSTEM AND METHOD FOR PARAMETER MEASUREMENT IN WELL

BACKGROUND

Technical Field

Embodiments of the subject matter disclosed herein generally relate to a system and method for measuring, with a gauge, a parameter in an oil well. The gauge has almost no electronic components so that adverse conditions in the well have a reduced impact on the gauge's life expectancy.

Discussion of the Background

During drilling and/or exploration of a well (borehole), which is intended to exploit underground resources (e.g., oil and gas), various equipment is operating in the well. However, the well environment, especially for deep wells, is harsh for the equipment. For example, a temperature in the well may reach 300° C. while a pressure there may reach 3000 psi. Under these conditions, the existing equipment will fail relatively quickly.

Primary reasons of failures for downhole gauges are related to electronic components failure and seal leaks, which allow downhole fluid entry into the gauge. An electronic component is defined herein as any element that includes at least one semiconductor device (e.g., diodes, transistors). Operating at temperatures above 150° C., limits the availability and type of electronic components that can be used. In particular, at temperatures above 177° C., reliable electronic component availability is limited, while above 200° C., their availability is very limited (for example, only some SiC (Silicon Carbide) and some SOI (Silicon on Insulator) are available in this temperature range). These components are expensive and have issues surviving even one year at temperatures up to 250° C.

Several other standard materials (most solders, polymers, adhesives, and most common dielectric insulating materials) that are currently found in the electronic components cannot be used in this adverse environment due to their failures at high temperature.

However, measuring downhole pressure and temperature inside oil and gas wellbores is critical for determining various other wellbore characteristics such as: reservoir properties, over-pressure, equipment over-heating, and the wellbore fluid height. In artificial lift wells, it is important to maintain a reservoir fluid height so the pump does not pump dry and become damaged. In steam injection wells, it is important to know the steam temperature to optimize production.

Existing solutions for measuring downhole characteristics (pressure, temperature, viscosity, hydrocarbon content, water cut, etc.) that do not use electronics inside the well involve: fiber optics, acoustic measurement, tuning fork vibration, and magnetic flux coupling measurement. Fiber optics is extremely expensive and therefore, only used on high-end, capital intensive field projects. Acoustic measurement frequencies are in the range of sound pressure (normally 300 Hz to 8 KHz), which make them undesirable. For small sensor size, the resonant frequency is higher. A tuning fork uses large area mechanical vibration unlike the quartz, which uses stress to alter the internal lattice structure to create a change in the resonant frequency. Crystals are usually in the range of 32 KHz to several MHz. Additionally, lower frequency sensors are more susceptible to man-made electrical noise along cables such as 3-phase motors.

Other methods use a mechanical resonator, as for example, U.S. Pat. No. 7,647,965. A drawback of a mechanical sensor is that these devices need additional electronics or coils to couple the electrical energy to the mechanical energy.

Thus, there is a need for having reliable temperature and/or pressure gauges that can withstand the high temperatures and pressures present in the well, are not expensive and are reliable.

SUMMARY

In various embodiments, an apparatus and method is provided for measuring a temperature and/or pressure in a well without having any electronics present in the well, thus avoiding the problems experienced by the existing devices.

In one embodiment, there is a method for measuring a parameter within a well, the method including a step of connecting a gauge to a first end of a cable and connecting a vector network analyzer to a second end of the cable, a step of lowering the gauge inside the well, a step of generating a signal with the vector network analyzer and sending the signal along the cable to the gauge, a step of sweeping a frequency of the signal within a given range while feeding the signal to the gauge, a step of determining a resonance frequency of at least one sensor located within the gauge, and a step of calculating the parameter from the resonance frequency of the at least one sensor.

In another embodiment, there is a system for measuring a parameter within a well. The system includes a vector network analyzer located above ground, a gauge having at least one sensor having a resonant frequency that changes with the parameter, the gauge being adapted to be located within the well, and a cable connecting the gauge to the vector network analyzer.

In still another embodiment, there is a computing device for measuring a parameter within a well. The computing device includes an interface connected to a vector network analyzer and a processor connected to the interface. The processor is configured to control the vector network analyzer to generate a signal and send the signal along a cable to a gauge located within the well, control the vector network analyzer to sweep a frequency of the signal within a given range while feeding the signal to the gauge, determine a resonance frequency of a sensor located within the gauge, and calculate the parameter with a calibration engine based on the resonance frequency. The resonance frequency changes with the parameter.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a system and method for measuring a parameter in a well are discussed.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method and device that take advantage of (1) a resonance frequency of a sensor (e.g., quartz crystal) and (2) radio-frequency (RF) impedance matching for measuring various well quantities with a gauge that has no electronics. In one embodiment, the gauge includes one or more sensors, but no electronics associated with the sensors. For this embodiment, all the necessary electronics is located at the surface, away from the high temperature and pressure conditions (among other constraints). In one embodiment, there are no electronic and mechanical support components with the gauge, thus increasing the operating life of the gauge at a temperature above 200° C. According to another embodiment, the method and device to be discussed next eliminate the need for calibration of a long downhole cable that connects the gauge to a surface readout equipment. When the sensor is a quartz crystal, the method and device can take advantage of the existing quartz sensors, i.e., the existing sensors can be used with the novel method for reading a value of the desired parameter in the well. For simplicity, in the following, it is considered that the measured parameter is the temperature and/or pressure. However, those skilled in the art, would understand that other parameters may be measured with the methods and systems to be discussed next.

Figure 1:
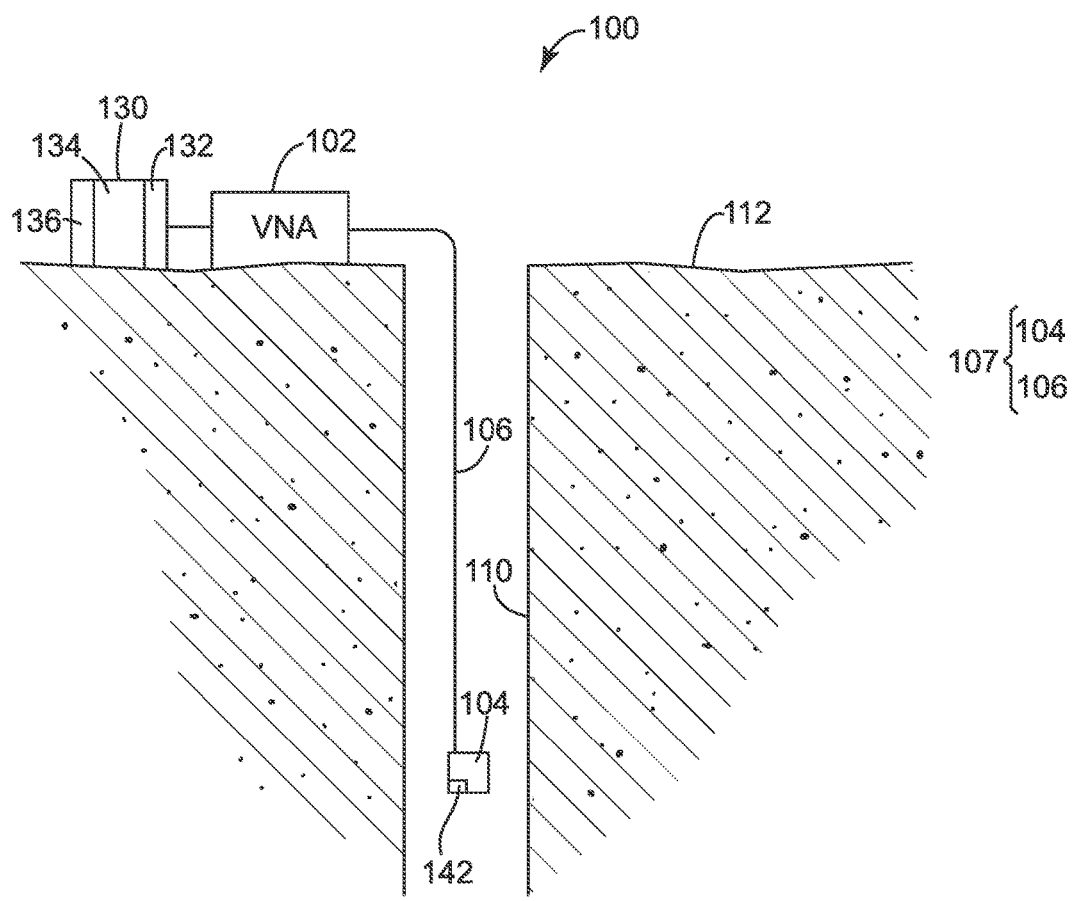
FIG. 1 illustrates a system for measuring a parameter within a well.

According to an embodiment illustrated in FIG. 1, a system 100 for measuring a parameter inside the well includes a vector network analyzer (VNA) 102, a gauge 104, and a cable 106 that connects gauge 104 to VNA 102. Gauge 104 is located inside well 110 while VNA 102 is located at the surface 112. In one embodiment, gauge 104 includes one or more resonant sensors 142, but no other electronics. A resonant sensor is a device that has a resonance frequency. The resonance frequency changes with temperature and/or pressure. In another embodiment, there is no electronics attached to the cable 106, except for the VNA 102 and gauge 104.

Sensor 142 may be a quartz crystal, an LC tank sensor, a parallel plate gapped capacitance, or a resonance cavity sensor. If sensors 142 only include quartz crystals, then, there is no electronic component in the entire system 100 except for VNA 102 and a computing device 130 associated with the VNA, which are not located in the well. Computing device 130 may include a communication interface 132, which communicates with the VNA, a processor 134, and a memory 136 for storing frequencies and other measurements acquired by the VNA. In this case, all the electronics is located at the surface, i.e., no electronics is located in the well.

Figure 2:
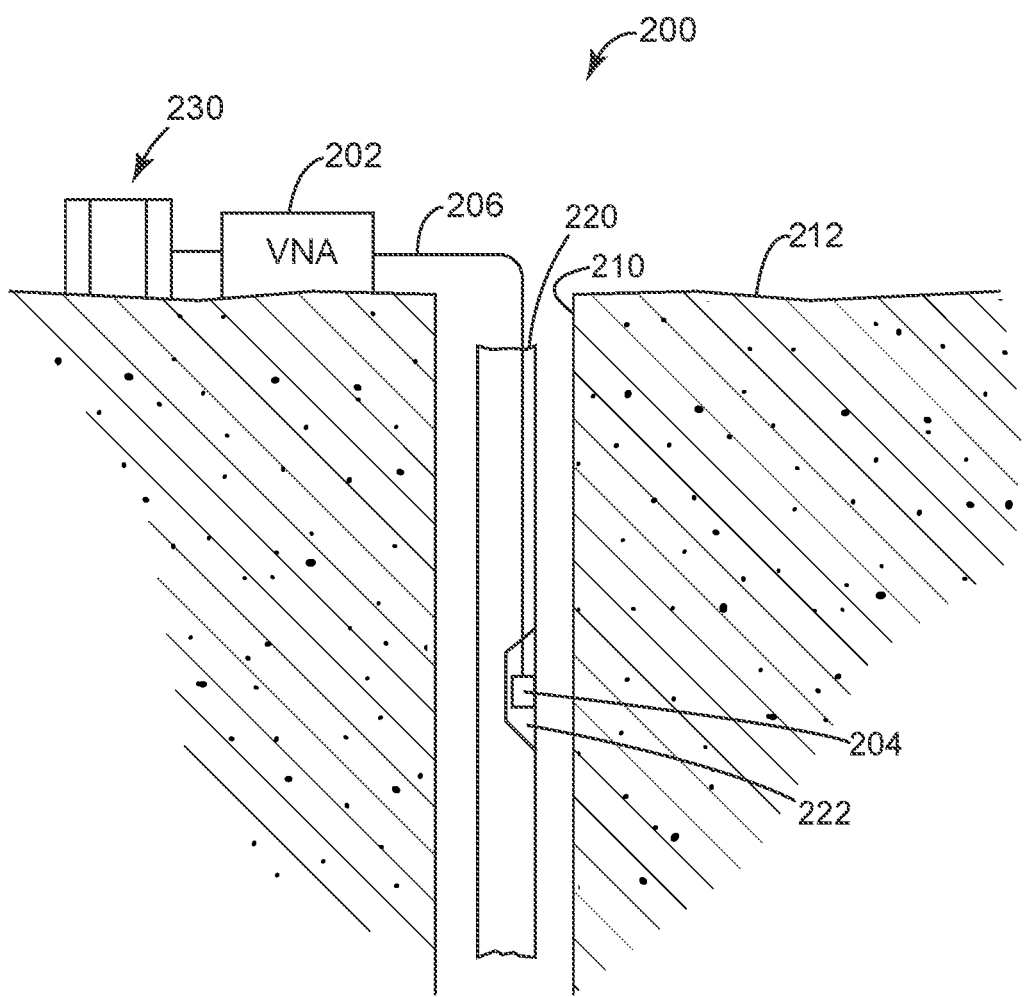
FIG. 2 illustrates another system for measuring a parameter with a well.

Cable 106 includes two conductors (not shown) insulated from each other and also insulated from the environment. In one application, cable 106 is a tubing encased cable (TEC) rated for high temperatures. In another application, cable 106 may include more than two wires. While FIG. 1 shows gauge 104 hanging freely from the end of cable 106, in another embodiment, illustrated in FIG. 2, system 200 has gauge 204 located in pocket (recess) 222 of a drill line 220. Those skilled in the art would understand that gauge 204 may be located in contact with the tubing of the well or in any other location. In FIG. 2, it is understood that cable 206 extends between the VNA 202 and gauge 204 through the wall of the drill line, or outside the drill line.

VNA 102 is an instrument that measures the network parameters of electrical networks, e.g., s-parameters associated with reflection and transmission of electrical networks. The VNA measures both the magnitude and the phase of an impedance, while a scalar network analyzer can measure only the magnitude of the impedance. VNA 102 may include one or more processor, splitter, variable frequency source, power attenuator, directional coupler, etc. In other words, there are many possible configurations for VNA 102, which are well-known to the person skilled in the art. However, note that all the electronic components noted above are located above ground, with no single component (except the sensor itself) located in the well.

VNA 102 is configured to measures the incident and reflected energies (which are associated with impedances) carried by a signal along cable 106 to gauge 104. Note that the cable and gauge are "viewed" by the VNA as a sub-system 107. The return reflected energy may be determined with a software algorithm that runs in the VNA 102. In one embodiment, the computing device 130 controls VNA 102 and runs the software algorithm, which can remove the 'imaginary' component of a 'complex value' of the impedance measurement. The remaining 'real' value may be used, as discussed later, after the sign of the value is removed (phase rotation), to determine a resonance frequency of the sensor.

Figure 3:
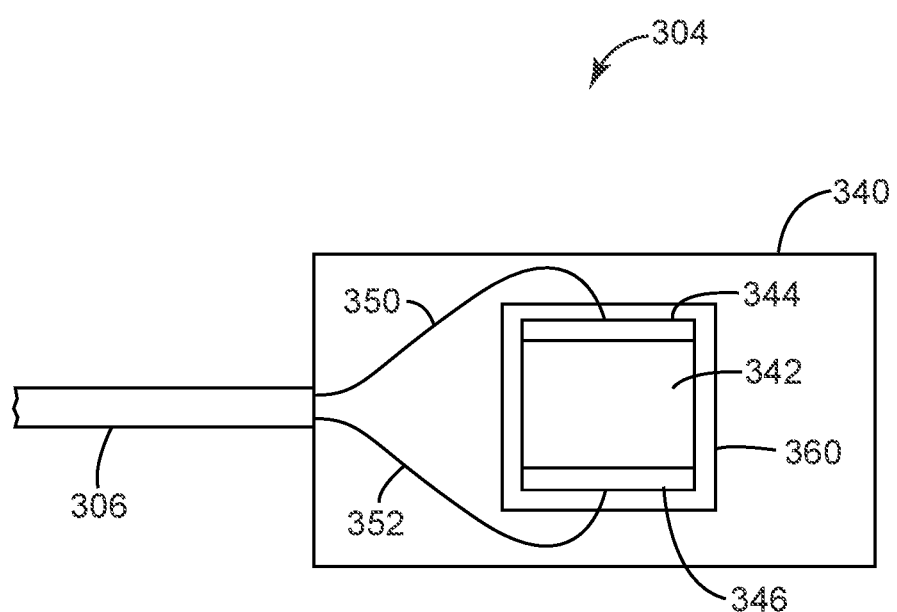
FIG. 3 illustrates a gauge that is lowered in a well for measuring a temperature.

Gauge 104 may have different configurations as now discussed. In one basic configuration, as illustrated in FIG. 3, gauge 304 has a housing 340 that hosts sensor (crystal in this case) 342. Crystal 342 may be sandwiched between two plates 344 and 346, which are electrically connected to the two wires 350 and 352, respectively, of cable 306. In one application, crystal 342 sits inside chamber 360, which is fully enclosed by housing 340, so that no fluid from the well enters the chamber. For this specific embodiment, the crystal is able to measure the temperature of the well. Note that in one embodiment, the housing does not include any other element than what it is shown in the figure. In this way, no electronic components, which are prone to failure, are present in the housing, thus avoiding the premature failure of the gauge. Also note that there is no feedback loop between gauge 104 and VNA 102.

Figure 4:
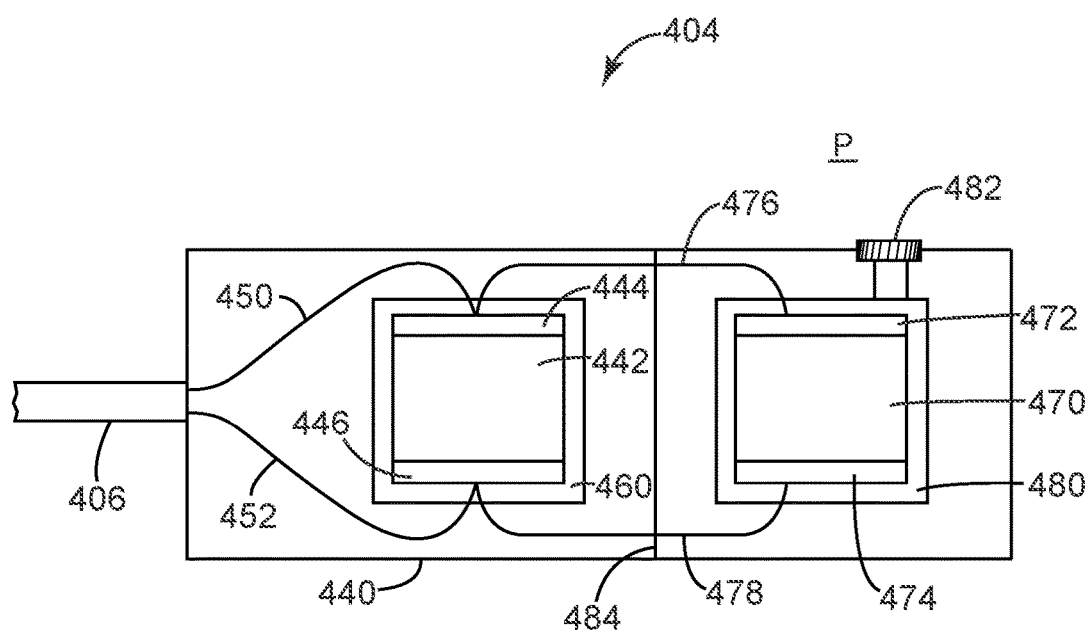
FIG. 4 illustrates a gauge that is lowered in a well for measuring a temperature and a pressure.

In another embodiment, as illustrated in FIG. 4, gauge 404 is similar to gauge 304, except that a second crystal 470 is present inside housing 440. Second crystal 470 is located in a corresponding second chamber 480, which is exposed to the ambient pressure P through a membrane 482 or a similar device. Second crystal 470 has corresponding plates 472 and 474, connected through wires 476 and 478, in parallel, to the first crystal 442. Because the first crystal 442 is not exposed to the ambient pressure P, this crystal is capable of measuring the temperature in the well while the second crystal, which is exposed to the ambient pressure, is capable of measuring the pressure in the well, after its output is adjusted for the temperature measured by the first crystal. Other configurations of gauge 104 may be imagined, with more than two crystals and/or for measuring other parameters than pressure, as long as the various crystals have non-overlapping resonant frequencies. Note that in view of temperature constraints, other parameters than temperature would usually require an additional sensor to adjust the measured parameter value with the temperature measured by the additional sensor. In one application, the one or more crystals that are present inside the housing are connected in parallel to the two wires of cable 106. Note that cable 106 may have more than two wires, if necessary.

Figure 5:
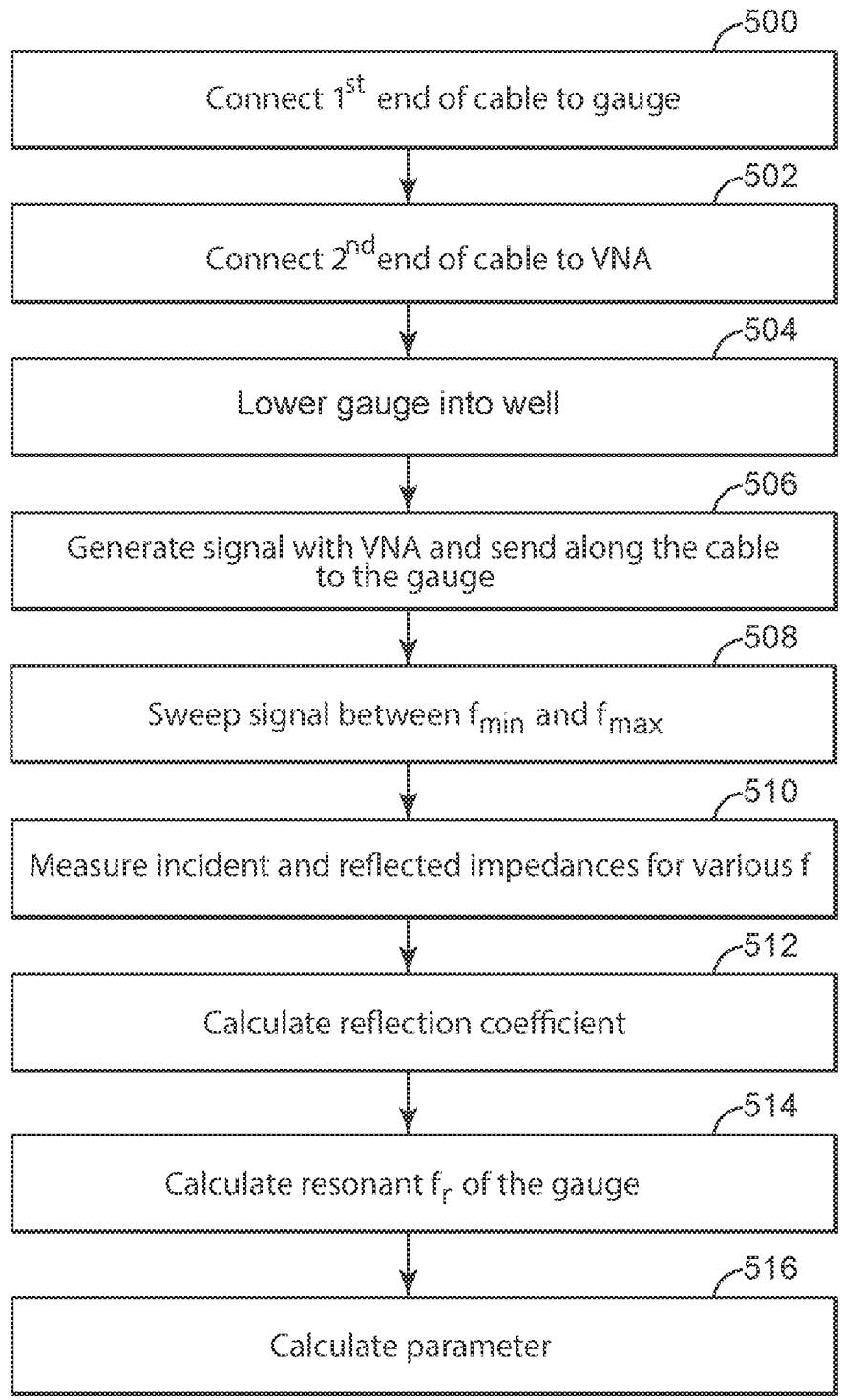
FIG. 5 is a flowchart of a method for measuring a parameter within a well.

A method for measuring the temperature and/or pressure, inside of a well, with a gauge that includes no electronics is now discussed with regard to FIG. 5. In step 500, a first end of cable 106 is connected to gauge 104 to be lowered into the well (as illustrated in FIG. 1 or 2). In step 502, a second end of cable 106 is connected to VNA 102. In step 504, the gauge is lowered into the well (note that lowering gauge 104 into the well 110 could be initiated before completion of step 502). After gauge 104 has reached the desired location inside the well and a thermal equilibrium with the environment has been achieved, an electromagnetic signal is generated by the VNA 102 and sent along the cable to the gauge in step 506. The generated electromagnetic signal has a frequency f. The VNA is configured to sweep in step 508 the frequency f of the signal within a given range, for example, between $f_{min}$ and $f_{max}$, which are chosen as discussed later. For each swept frequency, the VNA measures in step 510 both the incident and the reflected energy. Note that the VNA "sees" the cable and the sensor as a single load, and thus, the VNA 102 measures the impedance of both the cable 106 and sensor 104 as a sub-system 107. The VNA may be programmed to select some frequencies in the $f_{min}$ to $f_{max}$ range, for example, to send those frequencies separated by a given interval $\Delta f$. This interval may have any desired value, for example, 1 Hz, 10 Hz, 100 Hz, 1 kHz, etc.

Based on the measurements made in step 510, VNA 102 or associated computing device 130 (shown in FIG. 1), calculates in step 512 a reflection coefficient gamma:

$$\gamma = \frac{Z_l - Z_s}{Z_l + Z_s} \quad (1)$$

where $Z_l$ is the load impedance and $Z_s$ is the source impedance.

In step 514, the VNA 102 or associated computing device 130 calculates the resonant frequency $f_r$ of the crystal, for the given temperature and/or pressure conditions in the well, by selecting the reflection coefficient having the smallest signal amplitude (minimum absolute real impedance value) for the considered swept frequency range.

Figure 6:
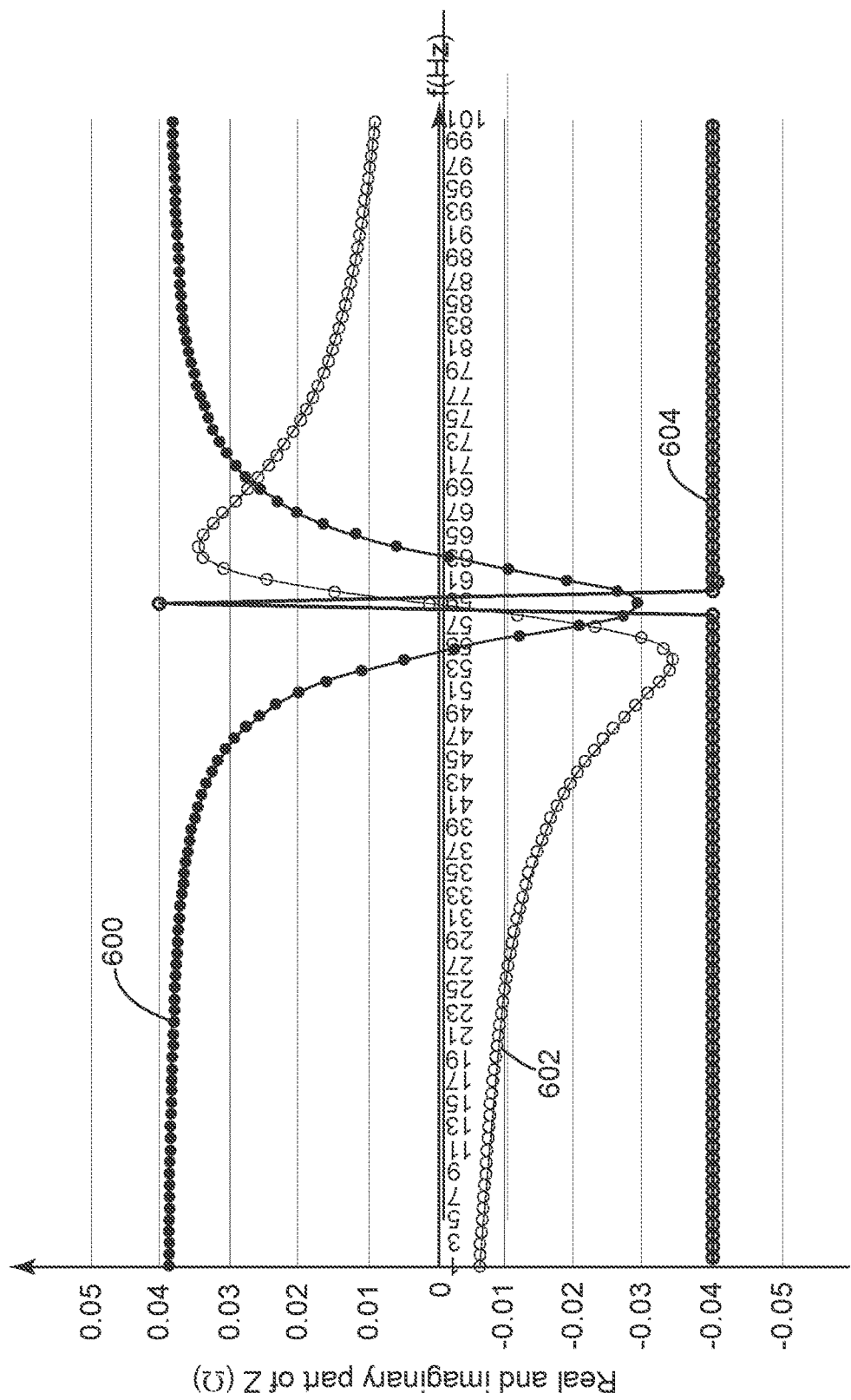
FIG. 6 is a Cartesian graph of real and imaginary components of a measured reflection coefficient for determining a resonance frequency for a single sensor.

For example, FIG. 6 is a Cartesian plot illustrating: (1) the real component value (curve 600) of the reflection coefficient versus frequency f, and (2) the imaginary component value (curve 602) of the reflection coefficient versus frequency f. FIG. 6 also shows that the resonant frequency (identified by marker 604) aligns with the minimum of the real component 600 of the measured reflected impedance. In one embodiment, the resonant frequency also aligns with a zero value (or minimum of the absolute value) of the imaginary component of the measured reflected impedance.

Figure 7:
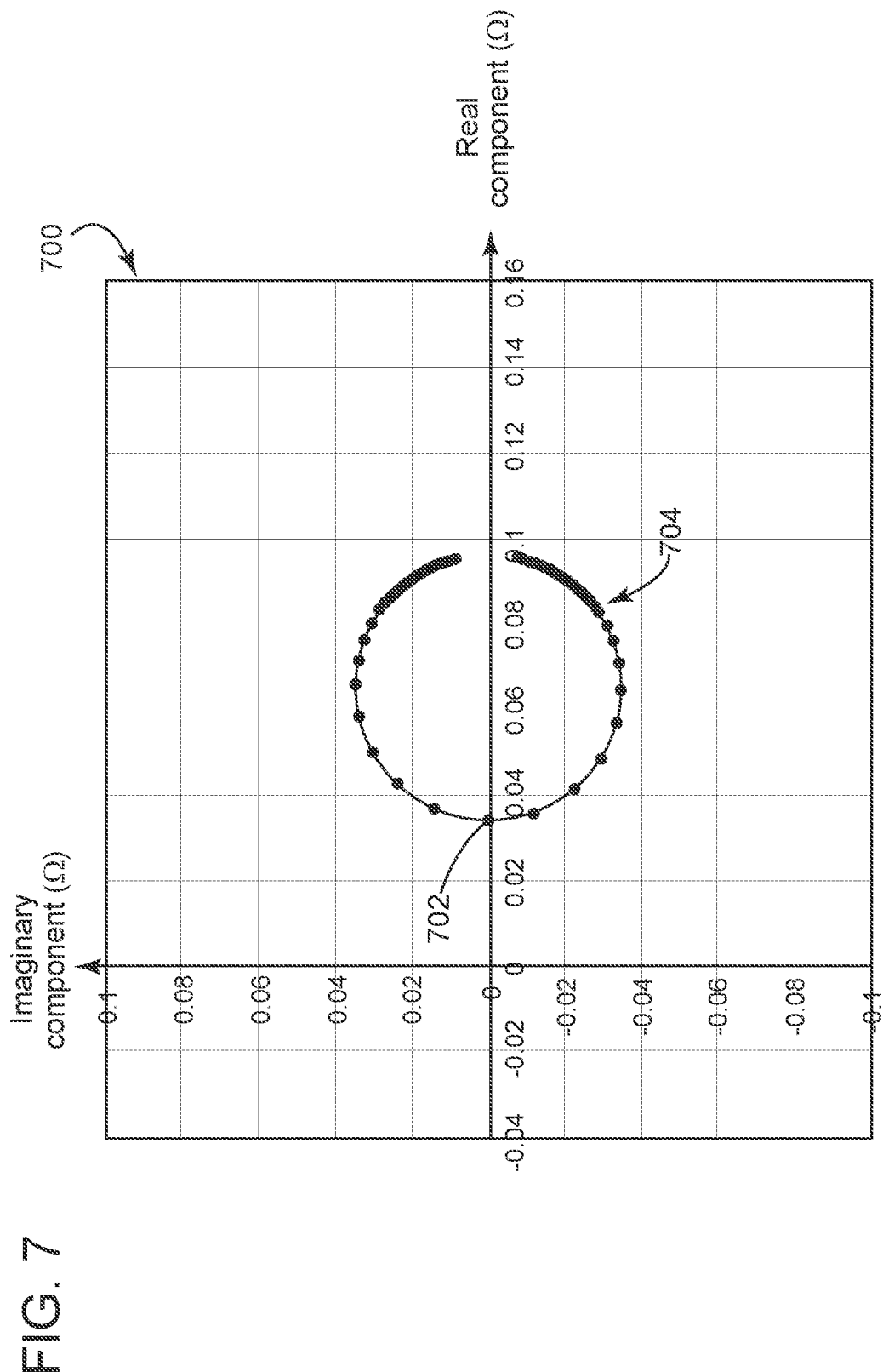
FIG. 7 is a Nyguist graph of real and imaginary components of a measured reflection coefficient for determining a resonance frequency for a single sensor.

FIG. 7 is a Nyquist plot of the real component versus the imaginary component of the measured reflected impedance, with dot 702 illustrating the resonant frequency. The "real" value of the reflection coefficient is always a positive value while the reflected "imaginary" component of the impedance can be positive or negative, depending on the rotation of the phase angle caused by cables that are longer than $\lambda/4$ (i.e., the wavelength of the cable divided by 4) when measured at the resonant frequency of the quartz crystal. Therefore, referencing the Nyquist plot 700 in FIG. 7, the resonant frequency is identified by the minimum absolute value of the real component when the imaginary component is zero, i.e., dot 702.

Note that curve 704 includes many points, each point corresponding to a measurement made by the VNA for a corresponding frequency from the given frequency range. The number of measurements may vary, as decided by the operator of the system. There are cases where the minimum absolute value of the imaginary component does not cross the zero-axis (due to phase rotation of the cable). In this case, the "imaginary" value needed to determine the resonant frequency becomes the minimum absolute value for the duration of the sweep while for the "real" component, its minimum value is used.

The ideal case for measuring the resonance frequency of the crystal requires the removal of the cable between the crystal(s) and the VNA. The ideal case will result in a Nyquist plot with a curve 704 being a circle having a radius equal to the magnitude of the values of the real vs. imaginary values over a particular frequency span (see FIG. 7). The amplitudes of the values on the plot are relative to the amount of reflected power measured by the VNA.

However, the length of the cable relative to the resonant frequency of the crystal results in a shift in the center of the circle relative to the origin of the axes in the figure, namely a phase shift in the system that is non-zero. This single modification in the outcome of the measurement means that this method is insensitive to the type or length of the cable used to measure the resonant frequency. One advantage of this method is thereby that there is no need to know, a priori, the impedance of the cable, i.e., to calibrate the cable prior to using it.

Figure 8:
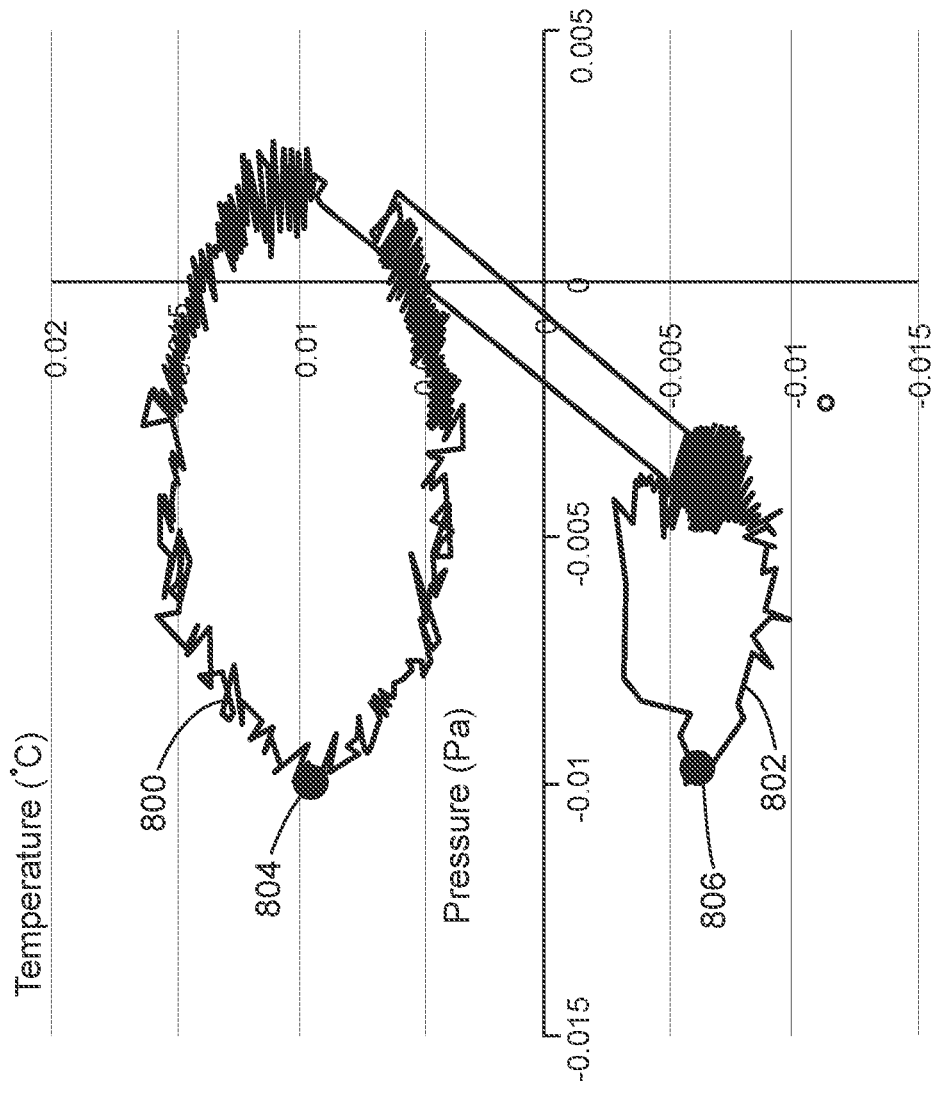
FIG. 8 is a Nyquist graph of real and imaginary components of a measured reflection coefficient for determining a resonance frequency for two sensors.
Figure 9:
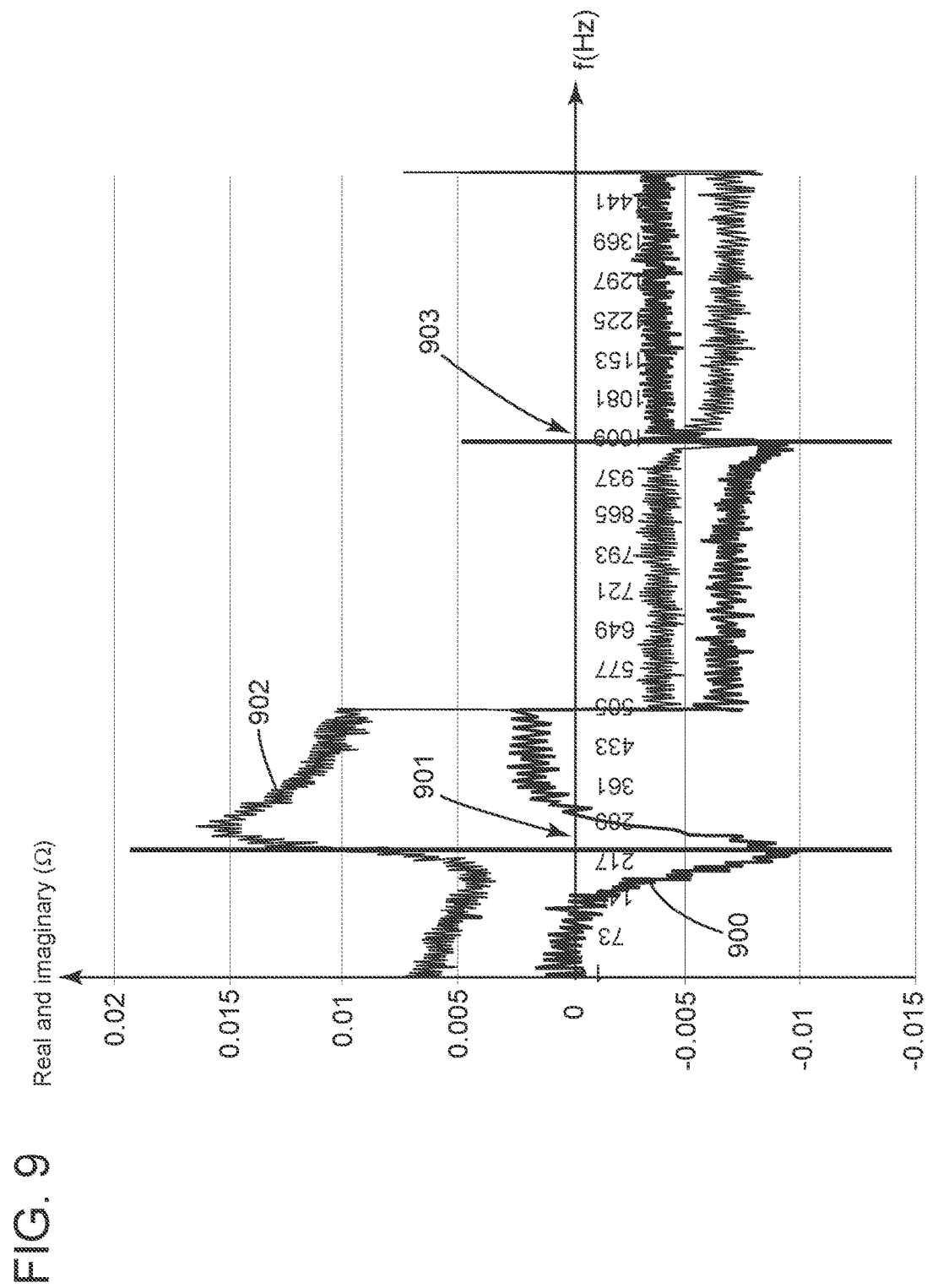
FIG. 9 is a Cartesian graph of real and imaginary components of a measured reflection coefficient for determining a resonance frequency for two sensors.

In this regard, consider a system that includes a cable having a length of about 600 m, and two crystals 342, 442 (as in the embodiment of FIG. 4), connected in parallel to one end of the cable 106 and being exposed to a temperature of about 180° C. and a pressure of about $7 \times 10^6$ Pa. The system is configured to measure about 500 points in the selected frequency range, with a 1 Hz resolution. The selected frequency range is centered on the crystals' resonance frequencies. Both the pressure and temperature crystals are swept one after the other and thus, there are two Nyquist circles 800 and 802, as illustrated in FIG. 8. The Cartesian curves 900 and 902, for the real component and imaginary component, respectively, versus frequency f are illustrated in FIG. 9. This raw data was collected for the "magnitude" and "phase" of the reflected impedance values. Conversion between magnitude (mag herein) and phase (θ) to the imaginary domain is achieved by using equations: Re=mag*cos(θ) and Im=mag*sin(θ). The "magnitude" and "phase" are then converted with the software to the "real" and "imaginary" values for plotting and resonance determination.

The Cartesian plot of FIG. 9 shows the "real" and "imaginary" components plotted on the Y-axis. The applied frequency sweep from the VNA is shown on the X-axis. There are two resonances 901 and 903, one for each crystal. The first resonance 901 is the resonance of the temperature crystal and the second resonance 903 is the resonance of the pressure crystal. The x-axis represents the frequency in steps of 1 Hz, starting slightly below the resonance for both crystals. For both plots in FIGS. 8 and 9, the frequency spans are centered at 4.000 MHz and 4.362 MHz for the temperature and pressure crystals, respectively.

As shown in FIG. 8, the magnitude of the temperature crystal signal is larger than the magnitude for the pressure crystal, and there are fewer points on the Nyquist circle 802 for the pressure crystal due to low bandwidth and high Q resonance. Even with the noise on the plot due to line losses of the cable and the low signal level, dots 804 and 806 can be identified on the graph in FIG. 8, which are markers that represent respectively the resonance of the temperature crystal and the pressure crystal. Both graphs show the X-axis (real axis) being at a minimum for the dots 804 and 806. The Y-axis (imaginary axis) is at the mid-point.

It is to note that the polarity of the phase is set by the length of the cable, and this in turn inverts the polarity of both the magnitude and phase of the returned signal. However, since the cable length has not been removed from the calculation via calibration, while calculating the resonant frequency $f_R$, the sign bit of the gamma (defined in equation 1) is not used. This allows a simplification of the method which uses the absolute value of the signal because there is no need for the cable phase information when determining the peak frequency of the reflected signal from the crystal.

Similarly, only the relative resonance amplitude is needed to determine the crystals' resonance frequency, with no need of the true impedance value. However, in one embodiment, it is possible to calibrate the cable before placing it in the well.

Returning to FIG. 5, after the resonant frequency is calculated in step 514 as discussed above, the method advances to step 516, in which the desired parameter (e.g., temperature or temperature and pressure) is calculated. The pressure or temperature related to the resonance of the crystal can be determined based on frequency calibration data. The frequency calibration data is used to preferably create polynomial curves that directly relate the resonant frequency to pressure or the resonant frequency to temperature. In this regard, calibration measurements (performed in the lab) can be made using various lengths of controlled impedance interface cables between the VNA (Source) and quartz crystals (Load). Cable lengths are limited by line loss or absorption at the applied resonant frequencies of the quartz crystals. Thus, in step 514 the parameter is calculated based on the resonance frequency and a polynomial fit calibration engine.

In one application, it is possible to measure the impedance of a load element at the end of a long cable with multiple phase rotations while not affecting the load impedance as reflected back to the source. More specifically, if a single crystal is attached to the end of the cable, the crystal may be placed inside an enclosure in which the temperature is controlled. The VNA will measure the reflection coefficient gamma for various temperatures, for example, from 0 to 400° C. For each set temperature, the VNA determines the resonance frequency of the crystal for the given temperature. This data is stored in the computing device and one or more polynomials are generated that describe the correlation between the ambient temperature and resonant frequency of the crystal.

For example, the temperature calibration function T may be a polynomial of order N in temperature as given by:

$$T = \sum_{i=0}^{i=N} A_i (S_t - S_{00})^i, \quad (2)$$

in which $A_i$ are calibration coefficients determined, for example, by a linear regression providing a least-square minimization, $S_t$ is the temperature output, and $S_{to}$ is the corresponding offset. Note that for deriving the temperature calibration function, the crystal is maintained at a constant pressure, for example, the atmospheric pressure.

The pressure calibration function P may be another polynomial of order N in pressure and order M in temperature, as given by:

$$P = \sum_{i=j=0}^{i=N, j=M} A'_{ij}(S_p - S_{p0})^i (S_t - S_{t0})^j, \quad (3)$$

where $A'_{ij}$ are calibration coefficients that may be determined by a linear regression as discussed above, $S_p$ is the pressure output and $S_{p0}$ is the corresponding offset. For determining the pressure, as discussed with regard to FIG. 4, two crystals are used. One crystal is kept inside the gauge at the atmospheric pressure and it is used to calculate only the temperature inside the well, based on equation (2), and the second crystal is exposed to both the pressure and temperature inside the well. Knowing the temperature measured by the first crystal, the measured resonant frequency and using equation (3), it is possible to measure the actual pressure within the well. The same is valid for any other parameter.

In the previous embodiments, it was discussed that the resonance frequency of the crystal is determined by measuring the reflection coefficient gamma. This is possible by using, for example, the RF impedance matching theory. The matching theory states that when impedances are mismatched (e.g., between the cable and the crystal, or the VNA and the cable), energy is reflected at the interface, i.e., not all energy is coupled from source to load. By matching the impedance of the length of the coupling cable 106 with that of the crystal 342, the reflected energy is eliminated and all energy from the source to the load is coupled. This means that the resonant frequency of the crystal has been achieved.

The Nyquist plots discussed above illustrate the incident and reflected signals (real vs. imaginary components) to illustrate operation and measurement of a crystal's resonance. As discussed above, the resonance of the crystal appears when the real value of the impedance is at the lowest point regardless of the value of the imaginary value.

Figure 10:
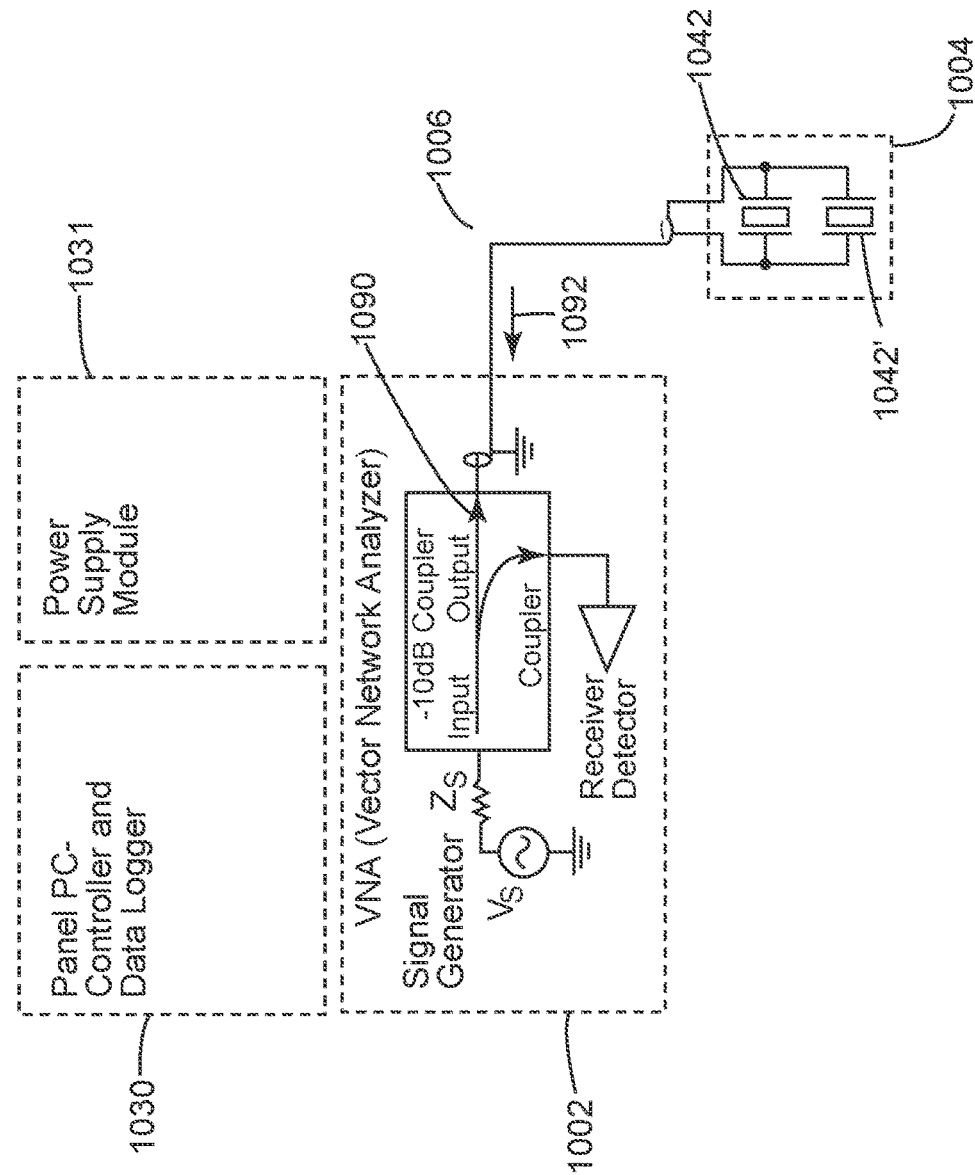
FIG. 10 illustrates a system for measuring a parameter within a well with a gauge that has no electronic components.

Next, one specific system 1000 for determining the pressure and/or temperature inside a well is discussed. FIG. 10 shows system 1000 having VNA 1002, gauge 1004 and cable 1006. VNA 1002 is shown having a signal generator, a coupler and a receiver detector (device that measures the reflected signal from the sensor). The cable may have a length of about 600 m and an impedance of about 65 Ohm. The source may have an impedance Zs of about 65 Ohm, i.e., matched to the cable so that there is no energy reflected at the interface between the VNA and the cable. Gauge 1004 is shown having two crystals 1042 and 1042', with an overall impedance at resonance between 20 and 100 Ohm. Gauge 1004 may have more than two crystals, connected, for example, in parallel. VNA 1002 is connected to a computing device 1030 and a power supply 1031.

When the VNA sends a signal 1090 to the cable and gauge, the initial frequency of the signal may be off from the resonance frequency of the cable plus gauge. If the cable's impedance has been matched with the VNA's impedance, then the signal's frequency may be off from the gauge's resonance frequency. In these cases, the return signal 1092 appears as corresponding to an open cable with a high impedance. This means that cable nulls or standing wave zero points are present. However, as the signal 1090 is swept over the frequency range selected by the operator, and as the frequency of the signal approaches the resonance frequency of the crystal, the measured impedance decreases and the cable nulls are reduced, until they almost disappear.

Once the crystal's resonance frequency is determined, the resonant frequency is applied to a calibration engine, for example a polynomial one (stored for example in the computing device 130 and run by processor 134), which is defined prior to the measurement by calibration at known pressures and frequencies, thus yielding known frequencies at set pressures and temperatures, e.g., 25° C., 50° C., 230° C., etc. After the pressure and temperature polynomial formula solution is found, the pressure and temperature values are displayed for the user, for example, on a screen of the computing device 1030.

As discussed above, the VNA excites the crystals with a frequency swept signal. This signal may be at a set power. The frequency sweep range of each crystal is determined from testing the crystal at low and high temperatures and pressures. The historical resonant frequency values are used as the limitations $f_{min}$ and $f_{max}$ for the frequency sweep range of the crystals. The amplitude of the frequencies is limited to below the damage point of the crystals. Typical maximum applied power levels are 100 µW. A 50 ohm load is assumed so maximum delivered power is approximately −10 dbm.

In one application, after the pressure and/or temperature are displayed, the system immediately collects data for another reading. The typical readings update rate is, in one application, about once per second.

Various technical features of the systems illustrated in the figures are now discussed. In one application, it is desirable that the cable impedance is as close as possible to the drive and receiver impedance of the VNA. A match between the VNA and the cable will reduce resonance nulls when measuring the impedance at the end of the cable (remember that based on the impedance matching theory, any mismatch of the VNA impedance to cable will introduce cable 'nulls' possibly causing a false reading for the resonance if the 'null' is inside the frequency search range for the crystal).

The pressure crystal may be a geometric "AT" cut while the temperature crystal may be a geometric "AC" cut. Note that the cut can affect temperature stability, pull range, and other motional parameters. Note that alternative cuts and designs may of course be considered. For example, the temperature sensitivity of a pressure quartz crystal, which might constrain the cable length, can be decreased. Similarly, the operating frequency of the quartz crystals can be reduced, which will result in reducing the cable dielectric absorption effect, resulting in the ability to use longer downhole cables.

To achieve high temperature and pressure accuracies while downhole, the surface VNA itself should better have an accuracy of <0.5 ppm and be rated for temperatures of −40° C. to +70° C. The crystal reference TCXO of the VNA preferably has a 0.5 ppm accuracy and an operating temperature of −40° C. to +85° C. to meet this requirement.

To prevent signal absorption (losses) in the cable, especially as the cable length increases, the crystals' resonance frequencies should be as low as possible.

Through multiple testing, it was found that for the existing crystals used by the Assignee of this application, the method works best if the real part of the crystal resonance impedance is equal to or less than the cable's impedance, e.g., about 65 ohms as measured, the pressure crystal impedance (resonance resistance RR) is typically <100 ohms, the temperature crystal impedance (RR) is typically <40 ohms, and crystal RR (equivalent series resistance) should be as low as possible. Using a 2.5 MHz temperature crystal reduces cable absorption by about 40%.

As mentioned above, the gauge and system discussed in previous embodiments may be used for measuring a parameter inside a well. Referring back to FIG. 5, a method for such measurement may include a step 500 of connecting a gauge to a first end of a cable, a step 502 of connecting a vector network analyzer to a second end of the cable, a step 504 of lowering the gauge inside a well (before or after step 502), a step 506 of generating a signal with the vector network analyzer and sending the signal along the cable to the gauge, a step 508 of sweeping a frequency of the signal within a given range while feeding the signal to the gauge, a step 514 of determining a resonance frequency of the gauge, and a step 516 of calculating the parameter based on the resonance frequency and a polynomial fit calibration engine.

The method may further include measuring a reflection coefficient associated with an energy incident along the cable toward the gauge and an energy reflected from the gauge, along the cable, to the vector network analyzer. As noted above, the reflection coefficient is a ratio between (i) a difference of a cable and gauge impedance and a vector network analyzer impedance, and (ii) a sum of the cable and gauge impedance and the vector network analyzer impedance.

The method may also include a step of calculating a real component and an imaginary component of the reflection coefficient for the swept frequencies, a step of selecting a lowest value of the real component, a step of identifying a frequency corresponding to the lowest value of the real component as the resonant frequency. The polynomial fit calibration engine may be a software that is run either by the VNA or by the computing device and uses frequency calibration data. The frequency calibration data is obtained in a controlled environment, by exposing the gauge to known values of the parameter.

The method may also include a step of generating, based on the frequency calibration data, polynomial curves that directly relate the frequency to a temperature and/or a pressure of the gauge. The polynomial fit calibration engine transforms the calculated resonance frequency to actual temperatures and/or pressures based on the polynomial curves. In one application, the cable is not calibrated prior to parameter estimation. As previously discussed, the parameter may be the temperature and the gauge only includes a temperature crystal, or the parameter is the pressure and the gauge only includes a temperature crystal and a pressure crystal.

In one embodiment, the computing device 130 is configured to control the vector network analyzer and run the polynomial fit calibration engine. More specifically, in this embodiment, the computing device includes an interface 132 connected to a vector network analyzer 102 and a processor 134 connected to the interface 132 and configured to control the vector network analyzer to generate a signal 1090 and send the signal along a cable 106 to a gauge 104 located within the well, control the vector network analyzer to sweep a frequency of the signal within a given range while feeding the signal to the gauge, determine a resonance frequency of a sensor located within the gauge, and calculate the parameter with a polynomial fit calibration engine based on the resonance frequency. The gauge is free of electronic components except for the sensor. The resonance frequency changes with the parameter.

The disclosed exemplary embodiments provide an apparatus and method for measuring a parameter in a well with minimum or no electronic components located in the well. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for measuring a parameter within a well, the method comprising:
   connecting a gauge to a first end of a cable and connecting a vector network analyzer to a second end of the cable;
   lowering the gauge inside the well;
   generating a signal with the vector network analyzer and sending the signal along the cable to the gauge;
   sweeping a frequency of the signal within a given range while feeding the signal to the gauge;
   determining a resonance frequency of at least one sensor located within the gauge; and
   calculating the parameter from the resonance frequency of the at least one sensor using a calibration system that includes a polynomial fit calibration engine.

2. The method of claim 1 wherein the gauge is free of electronic components except for the at least one sensor.

3. The method of claim 1, further comprising:
   calculating a reflection coefficient associated with (i) an energy incident along the cable toward the gauge and (ii) an energy reflected from the gauge, along the cable, to the vector network analyzer.

4. The method of claim 3, wherein the reflection coefficient is calculated as a ratio between (i) a difference of a cable and gauge impedance and a vector network analyzer impedance, and (ii) a sum of the cable and gauge impedance and the vector network analyzer impedance.

5. The method of claim 3, further comprising:
   calculating real components and imaginary components of the reflection coefficient for the swept frequencies;
   selecting a lowest real component; and
   identifying a frequency corresponding to the lowest real component as the resonant frequency of the sensor.

6. The method of claim 1 wherein the calculation of the parameter from the resonance frequency is made through a calibration system.

7. The method of claim 1, further comprising:
   generating, based on frequency calibration data, polynomial curves in the polynomial fit calibration engine that directly relate the frequency to a temperature and/or a pressure experienced by the gauge.

8. The method of claim 1, wherein the polynomial fit calibration engine maps the calculated resonance frequency to actual temperatures and/or pressures based on polynomial curves.

9. The method of claim 1, wherein the cable is not calibrated prior to generating the signal.

10. The method of claim 1, wherein the parameter is a temperature and the gauge only includes a temperature crystal.

11. The method of claim 1, wherein the parameter is a pressure and the gauge only includes a temperature crystal and a pressure crystal.

12. A system for measuring a parameter within a well, the system comprising:
   a vector network analyzer located above ground;
   a gauge having at least one sensor having a resonant frequency that changes with the parameter, the gauge being adapted to be located within the well;
   a cable connecting the gauge to the vector network analyzer; and
   a computing device that calculates a reflection coefficient associated with (i) an energy incident along the cable toward the gauge and (ii) an energy reflected from the gauge, along the cable, to the vector network analyzer, the computing device including a polynomial fit calibration engine that uses frequency calibration data obtained in a controlled environment.

13. The system of claim 12, wherein the vector network analyzer generates a signal and sends the signal along the cable to the gauge, sweeps a frequency of the signal within a given range while feeding the signal to the gauge, determines a resonance frequency of the gauge, and calculates the parameter with the polynomial fit calibration engine based on the resonance frequency.

14. The system of claim 12, wherein the reflection coefficient is calculated as a ratio between (i) a difference of a cable and gauge impedance and a vector network analyzer impedance, and (ii) a sum of the cable and gauge impedance and the vector network analyzer impedance.

15. The system of claim 12, wherein the computing device calculates real components and imaginary components of the reflection coefficient for the swept frequencies;
   selects a lowest real component; and identifies a frequency corresponding to the lowest real component as the resonant frequency of the sensor.

16. The system of claim 12, wherein the computing device generates, based on the frequency calibration data, polynomial curves that directly relate the frequency to a temperature and/or a pressure experienced by the gauge.

17. A computing device for measuring a parameter within a well, the computing device comprising:
an interface connected to a vector network analyzer; and
a processor connected to the interface and configured to
control the vector network analyzer to generate a signal and send the signal along a cable to a gauge located within the well,
control the vector network analyzer to sweep a frequency of the signal within a given range while feeding the signal to the gauge,
determine a resonance frequency of a sensor located within the gauge; and
calculate the parameter with a calibration engine based on the resonance frequency using a calibration system that includes a polynomial fit calibration engine,
wherein the resonance frequency changes with the parameter.

* * * * *